(No Model.) 2 Sheets—Sheet 1.
G. W. HARRINGTON.
DUMPING WAGON.
No. 507,122. Patented Oct. 24, 1893.
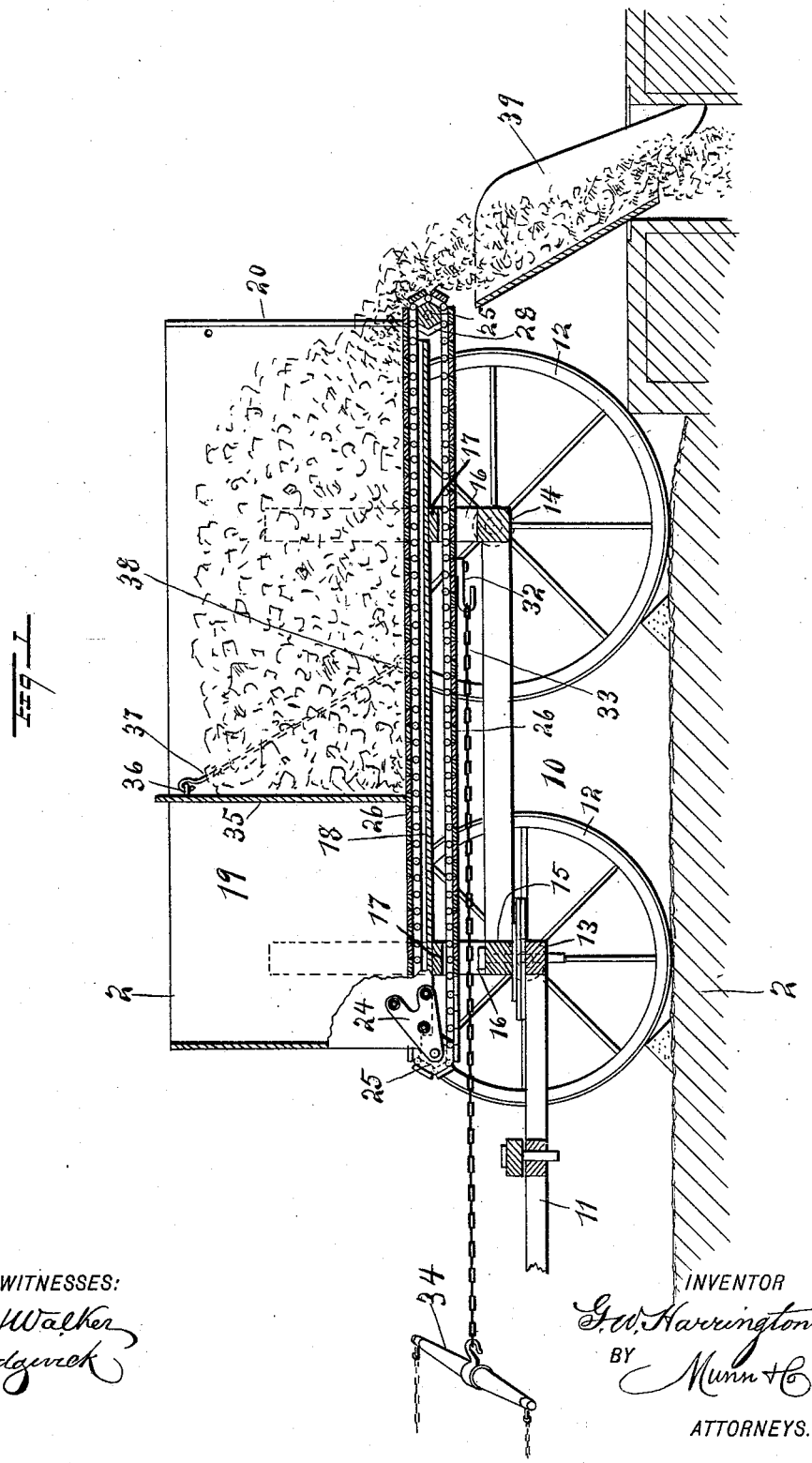
WITNESSES:
H. Walker
C. Sedgwick
INVENTOR
G. W. Harrington
BY
Munn & Co.
ATTORNEYS.

(No Model.) 2 Sheets—Sheet 2.
G. W. HARRINGTON.
DUMPING WAGON.
No. 507,122. Patented Oct. 24, 1893.
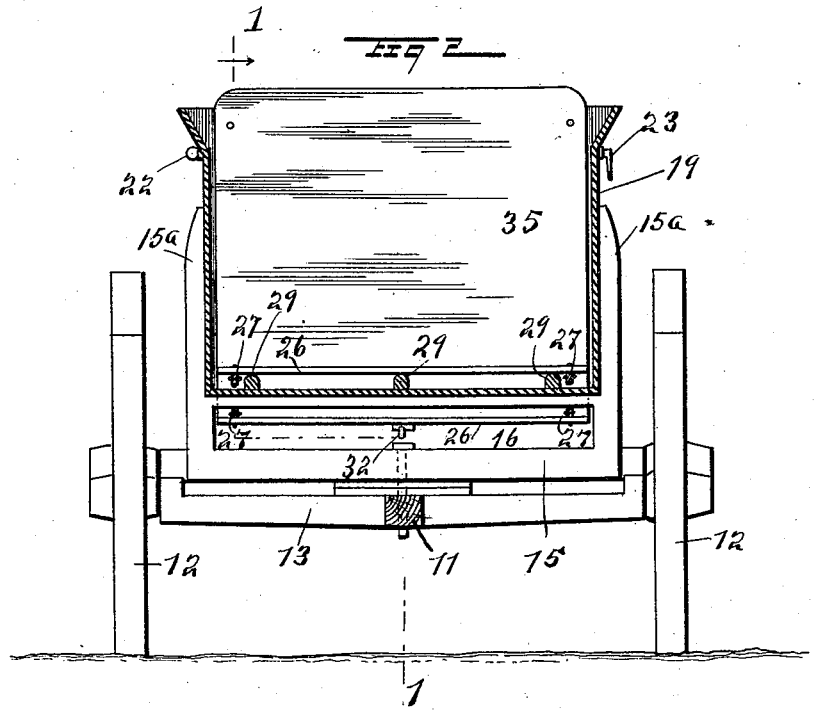
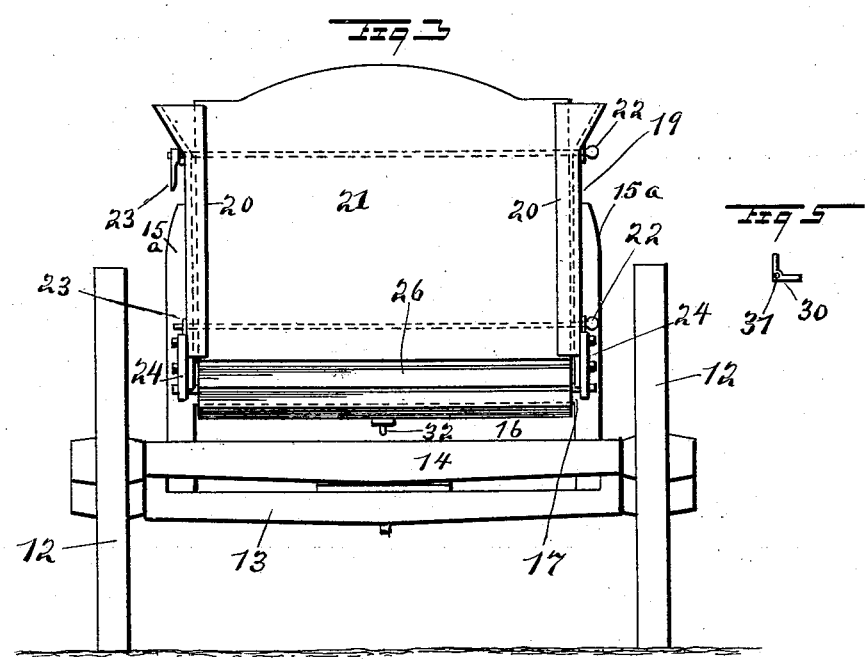
WITNESSES:
H. Walker
C. Sedgwick
INVENTOR
G. W. Harrington
BY Munn & Co.
ATTORNEYS.

UNITED STATES PATENT OFFICE.

GEORGE WM. HARRINGTON, OF PULLMAN, ILLINOIS.

DUMPING-WAGON.

SPECIFICATION forming part of Letters Patent No. 507,122, dated October 24, 1893.

Application filed November 19, 1892. Serial No. 452,501. (No model.)

*To all whom it may concern:*

Be it known that I, GEORGE WM. HARRINGTON, of Pullman, in the county of Cook and State of Illinois, have invented a new and Improved Wagon, of which the following is a full, clear, and exact description.

My invention relates to improvements in that class of wagons which are adapted for use in hauling coal or other loose material; and the object of my invention is to produce a simple wagon of this class which may be easily and quickly dumped or unloaded and in which the unloading may be done by the team.

To this end my invention consists in certain features of construction and combinations of the same, as will be hereinafter described and claimed.

Reference is to be had to the accompanying drawings, forming a part of this specification, in which similar figures of reference indicate corresponding parts in all the views.

Figure 1 is a broken longitudinal section of the wagon on the line 1—1 in Fig. 2. Fig. 2 is a cross section on the line 2—2 in Fig. 1. Fig. 3 is a rear elevation of the wagon. Fig. 4 is a detail view of one of the carrier rollers; and Fig. 5 is a detail end view of a modified form of slat for the carrier.

The wagon has the usual running gear 10 which is provided with four wheels 12 journaled on axles 13 and 14, and a pole 11 or a pair of shafts are secured to the forward axle 13 in the usual manner. On the front axle 13 is a bolster 15 which is fastened by a king bolt in the usual way, and the bolster is longitudinally slotted, as best shown at 16 in Fig. 2, so as to provide room for the endless carrier which serves to unload the coal. The rear bolster is exactly like the forward one, with the exception that its lower portion is formed integral with the rear axle 14. Above the slots 16 of the bolsters are the bearing portions 17 which support the bed or bottom 18 of the wagon box 19, which box may be of any approved kind, but it is preferably rectangular in shape. The bolsters have vertical side arms 15ª which fit against the sides of the wagon box and serve as braces.

At the rear end of the box are inwardly turned flanges 20, which form abutments for the end board 21, and the latter is held in place by cross rods 22 which are threaded at one end and provided with lever nuts 23 which serve to hold them in place, and the rods thus prevent the loaded box from spreading. At the lower corners of the box are hangers 24 which are firmly secured to the box and in which are journaled the rollers 25 which carry the endless belt and carrier 26, and this carrier consists of parallel cross slats of the usual kind which are mounted on links 27 and these are pivoted together in the usual way. The rollers 25 are recessed near the ends, as shown at 28, so as to provide a space for the links and enable the body of the carrier to run smoothly over the rollers. The rollers are also preferably provided with faceted sides so as to prevent the carrier from slipping.

Instead of the cross slats shown in Fig. 1, a cross slat 30 shown in Fig. 5 may be used, which consists of a strip of angle iron adapted to be pivoted at its elbow 11 to the carrying links 27. The upper portion of the endless carrier extends longitudinally through the wagon box and above the floor or bed 18, while the lower member of the carrier passes through the slots 16 of the bolsters. To provide against excessive wear, the floor or bed 18 is provided with parallel longitudinal metallic strips 29, see Fig. 2, on which the carrier runs, and these strips are preferably half round in cross section so that there will be as little friction as possible. On the under side of the carrier 26 is secured a hook 32 which is arranged so as to come near the rear end of the wagon when the press board hereinafter described is near the front end of the wagon. By this means a chain 33 may be attached to the carrier, one end of the chain being secured to the hook 32, and a whiffletree 34 may be secured to the front end of the chain and a horse hitched to the whiffletree, and the horse by pulling forward draws the lower portion of the carrier forward and the upper portion is carried backward, thus dumping the coal as hereinafter described.

On the upper member of the carrier is a press board 35 which is arranged transversely in the box 19 and which extends to the top of the box and entirely across the same. This press board is provided near the top with keepers 36 in which are secured hooks 37 and the lower ends of the hooks are secured to keepers 38 on the carrier.

When the wagon is ready for use the press board 35 is near the front end of the box and the hook 32 is near the rear end of the wagon. The box is then filled with coal or other material in the usual way, and when it is to be unloaded a chute 39 is arranged in the ordinary manner at the tail end of the box, the end gate 21 is removed, and a horse connected with the hook 32 as described, and the hook drawn forward. This causes the carrier 26 to move over the rollers 25 and the press board 35 travels backward thus carrying the entire load with it, which load is forced over the tail end of the wagon and into the chute 39.

It will be understood, of course, that the chute forms no part of the invention, and the wagon may be used without a chute, and that when the wagon is to be unloaded it is necessary to trig the wheels as shown in Fig. 1.

Having thus described my invention, I claim as new and desire to secure by Letters Patent—

A wagon provided with bolsters supporting the body and having longitudinal slots 16, an endless apron encircling the bottom of the wagon from end to end with its lower half extending through said slots, a vertical push board 35 and a hook 32 or equivalent device to which a draft chain may be attached, substantially as set forth.

GEORGE WM. HARRINGTON.

Witnesses:
WILLIAM ROBBINS,
FRANK. W. HARRINGTON.